US012552541B2

(12) United States Patent
Mandel et al.

(10) Patent No.: US 12,552,541 B2
(45) Date of Patent: Feb. 17, 2026

(54) THERMAL MANAGEMENT SYSTEM FOR FUTURE VERTICAL LIFT AIRCRAFT

(71) Applicant: Hamilton Sundstrand Corporation, Charlotte, NC (US)

(72) Inventors: Raphael Mandel, West Hartford, CT (US); Joseph E. Turney, Amston, CT (US); Ram Ranjan, San Diego, CA (US); Matthew L. Pess, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 143 days.

(21) Appl. No.: 18/506,775

(22) Filed: Nov. 10, 2023

(65) Prior Publication Data

US 2025/0153852 A1 May 15, 2025

(51) Int. Cl.
*B64D 13/06* (2006.01)
*F25B 25/00* (2006.01)
*F25B 41/42* (2021.01)

(52) U.S. Cl.
CPC .......... *B64D 13/06* (2013.01); *F25B 25/005* (2013.01); *F25B 41/42* (2021.01);
(Continued)

(58) Field of Classification Search
CPC .......... B64D 13/06; B64D 2013/0674; F25B 2400/23; F25B 2400/0409;
(Continued)

(56) References Cited

U.S. PATENT DOCUMENTS 3,153,331 A * 10/1964 Rogers .................... F25B 11/00
62/402
3,681,934 A * 8/1972 Tudury ................ F25B 47/022
62/276
(Continued)

FOREIGN PATENT DOCUMENTS

AU 2021310128 A1 * 3/2023 .............. F25B 11/00
EP 2629040 A2 * 8/2013 .......... B60H 1/3227
(Continued)

OTHER PUBLICATIONS

Partial European Search Report for EP Application No. 24207841.8, dated Apr. 22, 2025, 21 pages.
(Continued)

*Primary Examiner* — Ljiljana V. Ciric
(74) *Attorney, Agent, or Firm* — Kinney & Lange, P.A.

(57) ABSTRACT

A thermal management system for an aircraft includes a liquid loop, a vapor compression cycle loop, and an air loop. The liquid loop includes a pump to deliver a working fluid a cold sink for cooling a heat load with the working fluid. The vapor compression cycle loop is fluidly coupled to the liquid loop by a separator. The separator is configured to separate a two-phase form of the working fluid into a vapor form of the working fluid for delivery to a compressor of the vapor compression cycle loop and a liquid form of the working fluid for delivery to the liquid loop. The air loop in thermal communication with the working fluid and configured to provide cooling or heating air for an aircraft cabin.

13 Claims, 4 Drawing Sheets

(52) U.S. Cl.
CPC .............. *B64D 2013/0674* (2013.01); *F25B 2313/02732* (2013.01); *F25B 2400/0403* (2013.01); *F25B 2400/0409* (2013.01); *F25B 2400/0411* (2013.01); *F25B 2400/23* (2013.01)

(58) Field of Classification Search
CPC ............ F25B 2400/0411; F25B 25/005; F25B 41/42; F25B 2313/02732; F25B 2400/0403
See application file for complete search history.

(56) References Cited

U.S. PATENT DOCUMENTS

| | | | | |
|---|---|---|---|---|
| 4,136,528 A * | 1/1979 | Vogel | | G05D 23/1931 |
| | | | | 62/DIG. 17 |
| 4,165,037 A * | 8/1979 | McCarson | | F25B 30/02 |
| | | | | 62/217 |
| 4,259,848 A * | 4/1981 | Voigt | | F25B 1/00 |
| | | | | 62/197 |
| 4,554,799 A * | 11/1985 | Pallanch | | F25B 1/10 |
| | | | | 62/509 |
| 5,174,123 A * | 12/1992 | Erickson | | F25B 1/047 |
| | | | | 62/278 |
| 5,186,013 A * | 2/1993 | Durso | | F01K 25/08 |
| | | | | 62/238.4 |
| 5,575,833 A | 11/1996 | Griffin | | |
| 6,330,800 B1 | 12/2001 | Price et al. | | |
| 6,820,434 B1 * | 11/2004 | Gutheim | | F25B 41/20 |
| | | | | 62/175 |
| 6,866,092 B1 * | 3/2005 | Molivadas | | F01L 3/12 |
| | | | | 165/47 |
| 6,948,331 B1 * | 9/2005 | Ho | | B64D 13/06 |
| | | | | 62/401 |
| 8,069,684 B2 * | 12/2011 | Heinbokel | | F25B 41/34 |
| | | | | 62/212 |
| 8,118,257 B2 * | 2/2012 | Wilmot, Jr. | | B64D 13/06 |
| | | | | 62/239 |
| 8,297,065 B2 * | 10/2012 | Vaisman | | F01K 25/06 |
| | | | | 62/503 |
| 8,327,651 B2 | 12/2012 | Finney et al. | | |
| 8,429,921 B2 | 4/2013 | Suharno et al. | | |
| 9,109,840 B2 * | 8/2015 | Kadle | | B60H 1/32284 |
| 9,482,451 B2 * | 11/2016 | Vaisman | | F25B 29/003 |
| 9,676,484 B2 * | 6/2017 | Vaisman | | B64D 13/006 |
| 9,719,699 B2 * | 8/2017 | Tamura | | F25B 13/00 |
| 9,851,130 B2 | 12/2017 | Love et al. | | |
| 10,088,202 B2 * | 10/2018 | Huff | | B60H 1/3232 |
| 10,183,548 B2 * | 1/2019 | Enomoto | | B60H 1/00485 |
| 10,288,325 B2 * | 5/2019 | Vaisman | | F25B 9/06 |
| 10,399,683 B2 | 9/2019 | Behrens et al. | | |
| 10,408,508 B2 | 9/2019 | Ronk et al. | | |
| 10,479,170 B2 * | 11/2019 | Enomoto | | B60H 1/00428 |
| 10,562,376 B2 * | 2/2020 | Miura | | B60H 1/00899 |
| 10,746,177 B2 | 8/2020 | Collins | | |
| 10,746,440 B2 | 8/2020 | Donovan et al. | | |
| 10,842,044 B2 * | 11/2020 | Snyder | | H05K 7/2039 |
| 10,907,869 B2 * | 2/2021 | Hagh | | F25B 40/00 |
| 10,954,467 B2 | 3/2021 | Rached | | |
| 11,022,349 B2 * | 6/2021 | Perrotin | | F25B 25/005 |
| 11,092,031 B2 | 8/2021 | Frank et al. | | |
| 11,162,388 B1 * | 11/2021 | Snyder | | F25B 25/005 |
| 11,215,383 B2 * | 1/2022 | Jansen | | F25B 41/20 |
| 11,448,432 B2 * | 9/2022 | Vaisman | | F25B 25/005 |
| 11,466,907 B2 * | 10/2022 | Bandhauer | | F25B 6/04 |
| 11,530,844 B2 * | 12/2022 | Unton | | F25B 43/00 |
| 11,561,033 B1 * | 1/2023 | Vaisman | | F25B 19/005 |
| 11,629,890 B1 * | 4/2023 | Vaisman | | F25B 5/02 |
| | | | | 62/199 |
| 11,629,892 B1 * | 4/2023 | Vaisman | | F25B 25/02 |
| | | | | 62/79 |
| 11,692,779 B2 * | 7/2023 | Rockenfeller | | F25B 25/005 |
| | | | | 165/10 |
| 11,698,210 B1 * | 7/2023 | Vaisman | | F25B 39/00 |
| | | | | 62/160 |
| 11,725,858 B1 | 8/2023 | Ladd | | |
| 11,732,941 B1 * | 8/2023 | Vaisman | | F25B 41/24 |
| | | | | 62/117 |
| 11,744,042 B2 | 8/2023 | Snyder | | |
| 11,796,230 B1 * | 10/2023 | Vaisman | | F25B 9/08 |
| 11,892,208 B2 * | 2/2024 | Jansen | | F25B 40/02 |
| 11,959,669 B2 * | 4/2024 | Unton | | F25B 41/22 |
| 11,988,418 B2 * | 5/2024 | Turney | | H05K 7/20936 |
| 12,078,397 B2 * | 9/2024 | Zug | | F25B 49/02 |
| 12,363,865 B2 * | 7/2025 | Khalili | | H05K 7/20327 |
| 2002/0007641 A1 | 1/2002 | Marsala | | |
| 2006/0162371 A1 * | 7/2006 | Lui | | B64D 13/06 |
| | | | | 62/402 |
| 2010/0083678 A1 * | 4/2010 | Lifson | | F25B 9/06 |
| | | | | 62/115 |
| 2011/0023514 A1 * | 2/2011 | Mitra | | F25B 1/10 |
| | | | | 62/513 |
| 2011/0048042 A1 * | 3/2011 | Chen | | F25B 9/008 |
| | | | | 62/115 |
| 2012/0011866 A1 * | 1/2012 | Scarcella | | F25B 41/39 |
| | | | | 62/79 |
| 2012/0023975 A1 * | 2/2012 | Yoon | | F25D 11/022 |
| | | | | 62/81 |
| 2012/0036854 A1 * | 2/2012 | Vaisman | | F01K 17/04 |
| | | | | 60/671 |
| 2012/0186290 A1 | 7/2012 | Howes et al. | | |
| 2013/0255289 A1 * | 10/2013 | Jung | | F25B 43/00 |
| | | | | 62/115 |
| 2014/0202178 A1 | 7/2014 | Trumbower | | |
| 2014/0326002 A1 * | 11/2014 | Sunderland | | F25B 49/027 |
| | | | | 62/190 |
| 2016/0138847 A1 * | 5/2016 | Zimmermann | | F25B 41/00 |
| | | | | 62/384 |
| 2019/0314945 A1 * | 10/2019 | Jansen | | B23Q 11/141 |
| 2019/0316818 A1 | 10/2019 | Spangler et al. | | |
| 2019/0360730 A1 * | 11/2019 | Hagh | | F25B 49/02 |
| 2020/0113085 A1 | 4/2020 | Schon et al. | | |
| 2021/0180851 A1 * | 6/2021 | Zha | | F25D 11/04 |
| 2021/0318042 A1 | 10/2021 | Molavi et al. | | |
| 2022/0074633 A1 | 3/2022 | Shu | | |
| 2022/0099340 A1 * | 3/2022 | Unton | | F25B 6/04 |
| 2022/0178602 A1 * | 6/2022 | Zug | | F25B 49/02 |
| 2022/0205691 A1 | 6/2022 | Spangler et al. | | |
| 2022/0243961 A1 * | 8/2022 | Dong | | F25B 5/02 |
| 2023/0247795 A1 * | 8/2023 | Khalili | | H05K 7/20327 |
| | | | | 165/80.4 |
| 2024/0118001 A1 * | 4/2024 | Ma | | F25B 1/08 |
| 2025/0067483 A1 * | 2/2025 | Sethi | | F25B 9/002 |
| 2025/0153852 A1 * | 5/2025 | Mandel | | B64D 13/06 |
| 2025/0155172 A1 * | 5/2025 | Mandel | | F25B 49/02 |
| 2025/0189189 A1 * | 6/2025 | Mandel | | F25B 41/39 |
| 2025/0269724 A1 * | 8/2025 | Lynn | | H01M 10/486 |

FOREIGN PATENT DOCUMENTS

| | | | | | |
|---|---|---|---|---|---|
| EP | | 3199456 | A1 * | 8/2017 | ............... F25B 7/00 |
| EP | | 3325898 | B1 * | 5/2021 | ............... F25B 41/20 |
| EP | | 4339531 | A1 * | 3/2024 | ............... F25B 1/00 |
| GB | | 2548123 | A | 9/2017 | |
| PL | | 213870 | B1 * | 5/2013 | ............... F25B 49/00 |
| WO | WO-2018204184 | | A1 * | 11/2018 | ............... F25B 40/00 |

OTHER PUBLICATIONS

Extended European Search Report for EP Application No. 24204805.6, dated Feb. 11, 2025, 8 pages.

* cited by examiner

THERMAL MANAGEMENT SYSTEM FOR FUTURE VERTICAL LIFT AIRCRAFT

BACKGROUND

The present disclosure relates generally to cooling systems and, more particularly, to thermal management for an aircraft, and specifically for a Future Vertical Lift (FVL) aircraft.

FVL is a program of the U.S. government to develop new rotorcraft. The thermal management system of a FVL aircraft must provide both air and liquid coolant streams in a narrow range of temperatures. There are typically two approaches. One approach is to use an air cycle machine that provides cold air directly but requires a liquid-to-air heat exchanger to produce chilled liquid coolant. The second approach is to use a vapor compression cycle, which produces a chilled refrigerant, and two heat exchangers, which can provide the cooling air and the cooling liquid. Heating may be required during cold operational conditions, and both foregoing approaches typically employ inefficient electric heaters to meet an increased temperature requirement.

SUMMARY

A thermal management system for an aircraft includes a liquid loop, a vapor compression cycle loop, and an air loop. The liquid loop includes a pump to deliver a working fluid a cold sink for cooling a heat load with the working fluid. The vapor compression cycle loop is fluidly coupled to the liquid loop by a separator. The separator is configured to separate a two-phase form of the working fluid into a vapor form of the working fluid for delivery to a compressor of the vapor compression cycle loop and a liquid form of the working fluid for delivery to the liquid loop. The air loop in thermal communication with the working fluid and configured to provide a cooling or heating air for an aircraft cabin.

A method of operating a thermal management system for an aircraft includes separating, by a separator, a vapor form of a working fluid from a liquid form of a working fluid; delivering the liquid form of the working fluid from the separator to a liquid loop, the liquid loop comprising a pump and a cold sink fluidly coupled in flow series; delivering the vapor form of the working fluid from the separator to a reversible vapor compression cycle loop, the reversible vapor compression cycle loop comprising a compressor, a first heat exchanger, a second heat exchanger, and an expansion valve; and cooling a cabin air of the aircraft with the working fluid in a cooling mode of operation or heating the cabin air of the aircraft with the working fluid in a heating mode of operation. Cooling and heating the cabin air comprises placing an air flow in thermal communication with working fluid in the second heat exchanger.

The present summary is provided only by way of example, and not limitation. Other aspects of the present disclosure will be appreciated in view of the entirety of the present disclosure, including the entire text, claims and accompanying figures.

Figure 1:
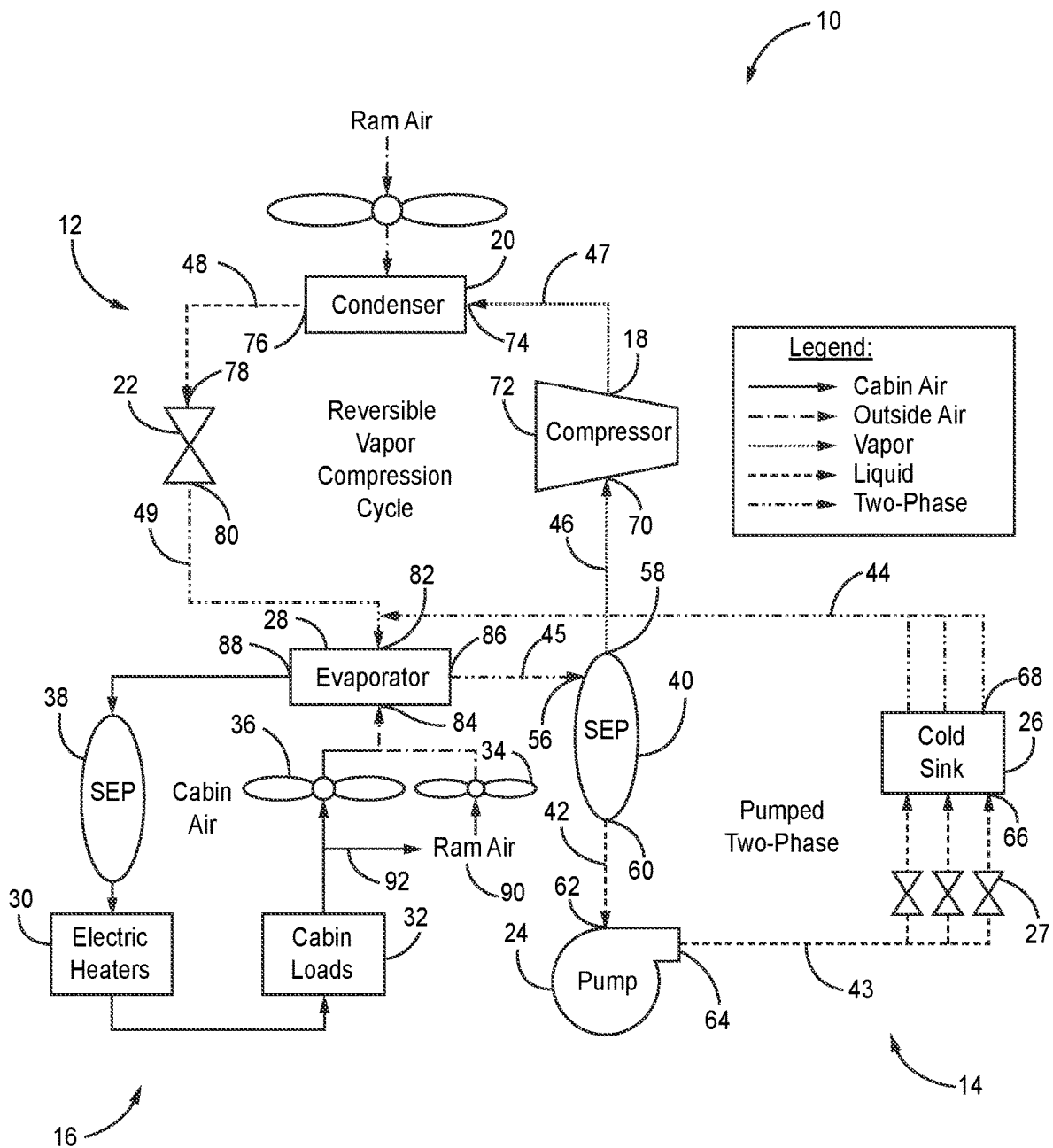
FIG. 1 is a schematic illustration of a thermal management system that combines a vapor cycle compression loop with a pumped two-phase loop and an air loop to produce a liquid coolant stream and a cooled or heated air stream.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The present disclosure is directed to thermal management systems for Future Vertical Lift (FVL) aircraft. The disclosed embodiments combine a vapor compression cycle with a pumped two-phase loop and interfacing air loop to provide cooling and heating air and cooling liquid for thermal loads with architectures that can meet weight and efficiency requirements. Although the disclosed embodiments are particularly suited to FVL aircraft, it will be understood by one of ordinary skill in the art that the embodiments disclosed herein can be used or adapted for use with other aircraft and are not limited to FVL aircraft.

FIG. 1 is a schematic illustration of single fluid thermal management system 10 with interfacing air and liquid loops configured for heating and cooling. Cooling system 10 includes a vapor compression cycle loop (referred to herein as vapor loop 12) with a direct pumped two-phase working fluid loop (referred to herein as liquid loop 14) and an interfacing air loop 16. Vapor loop 12 includes compressor 18, condenser 20, and expansion valve 22. Liquid loop 14 includes pump 24, one or more cold sink 26 (e.g., cold plate), and one or more flow restrictions 27 (e.g., orifices to meter fluid flow). Air loop 16 includes evaporator 28, electric heaters 30, cabin loads 32, and fans 34, 36. Air loop can additionally include separator 38. System 10 includes separator 40 disposed in fluid communication with each of vapor loop 12 and liquid loop 14. Fluid lines 42-49, separator inlet 56 and outlets 58, 60, pump inlet 62 and outlet 64, cold sink inlets 66 and outlets 68, compressor inlet 70 and outlet 72, condenser inlet 74 and outlet 76, expansion valve inlet 78 and outlet 80, evaporator inlets 82, 84 and outlets 86, 88, ram air inlet 90, and exhaust outlet 92 are additionally shown. Fluid lines 42-49 schematically illustrate the flow of fluid between components of system 10 and do not necessarily represent the arrangement of fluid conduits. For example, some of fluid lines may be combined in a single conduit upstream or downstream of a component. Likewise, labelling of inlets and outlets of components of system 10 is provided merely to illustrate a direction of fluid flow and is not intended to limit the invention. System 10 can include additional components not shown as may be required for thermal management and/or fluid control. The terms "fluidly coupled" and "in fluid communication" are used interchangeably herein and denote an ability to transfer fluid therebetween.

Working fluid is cycled through vapor loop 12, liquid loop 14, and evaporator 28 of air loop 16. Working fluid can be a refrigerant, for example and without limitation, 1,1,1,2-Tetrafluoroethane (R-134a) or 2,3,3,3-Tetrafluoropropene (R-123yf). Other refrigerants may be used without departing from the scope of the present disclosure. Working fluid is cycled through system 10 as a liquid, two-phase fluid, and saturated vapor as shown in FIGS. 1-4 and provides cooling to heat loads in thermal communication with cold sink 26 and to aircraft cabin air.

Working fluid is cycled through vapor loop 12, liquid loop 14, and evaporator 28 of air loop 16. Separator 12 is arranged downstream of evaporator 28 and upstream of compressor 18 and pump 24. Compressor 18 is arranged downstream of separator 40 and upstream of condenser 20. Condenser 20 is arranged downstream of compressor 18 and upstream of expansion valve 22. Expansion valve is arranged upstream of evaporator 28. Pump 24 is arranged downstream of separator 40 and upstream of cold sink 26. Cold sink 26 is arranged upstream of evaporator 28.

Within liquid loop 14, outlet 60 of separator 40 is fluidly coupled to inlet 62 of pump 24 as shown by fluid line 42. Outlet 64 of pump 24 is fluidly coupled to one or more inlets 66 of cold sink 26 via one or more flow restrictions 27 as illustrated by fluid line 43. One or more outlets 68 of cold sink 26 is fluidly coupled to inlet 82 of evaporator 28 as illustrated by fluid line 44. Outlet 86 of evaporator 28 is fluidly coupled to inlet 56 of separator 40 as illustrated by fluid line 45.

Within vapor loop 12, outlet 58 of separator 40 is fluidly coupled to inlet 70 of compressor 18 as illustrated by fluid line 46. Outlet 72 of compressor 18 is fluidly coupled to inlet 74 of condenser 20 as illustrated by fluid line 47. Outlet 76 of condenser 20 is fluidly coupled to inlet 78 of expansion valve 22 as illustrated by fluid line 48. Outlet 80 of expansion valve 22 is fluidly coupled to inlet 82 of evaporator as illustrated by fluid line 49. Condenser 20 may be arranged in fluid or thermal communication with ram air or air that is external to the aircraft or may be arranged within ram air ducts of the aircraft.

The flow of working fluid between components of system 10 is illustrated by arrows. The state of working fluid between components is shown. Separator 40 divides the flows of fluids of the working fluid (vapor and liquid) between liquid loop 14 and vapor loop 12.

Separator 40 receives the working fluid in the two-phase state from evaporator 28. The two-phase working fluid is separated into liquid and vapor components within separator 40. The liquid portion of the working fluid is delivered to liquid loop 14 for cooling a thermal load in thermal communication with cold sink 26. The vapor portion of the working fluid is directed to vapor loop 12.

Separator 40 may be a gravity or inertia driven component configured to separate the denser liquid phase from the less dense gaseous vapor phase. Compressor 18 arranged downstream of separator 40 can pull the vapor phase out of separator 40 while gravity acts to pull the liquid portion away from the vapor portion. Pump 24 arranged downstream of separator 40 may be used to pull the liquid from separator 40 through liquid loop 14. It will be appreciated that separator 40 is not limited to a gravity-type separator. For example, centrifugal gas-liquid separators may be used without departing from the scope of the present disclosure.

In vapor loop 12, the working fluid is compressed within compressor 18 and then condensed to a liquid state within condenser 20. The liquid working fluid is then expanded in expansion valve 22 into a two-phase state. The two-phase fluid is delivered to evaporator 28 before returning to separator 40.

The liquid portion of the working fluid received in liquid loop 14 from separator 40 is increased in pressure through pump 24 and provided to cold sink 26 for cooling purposes. The working fluid within liquid loop 14 is maintained in liquid form as it enters cold sink 26, which may include pressure regulating elements associated with each heat load that is thermally coupled to cold sink 26.

Figure 2:
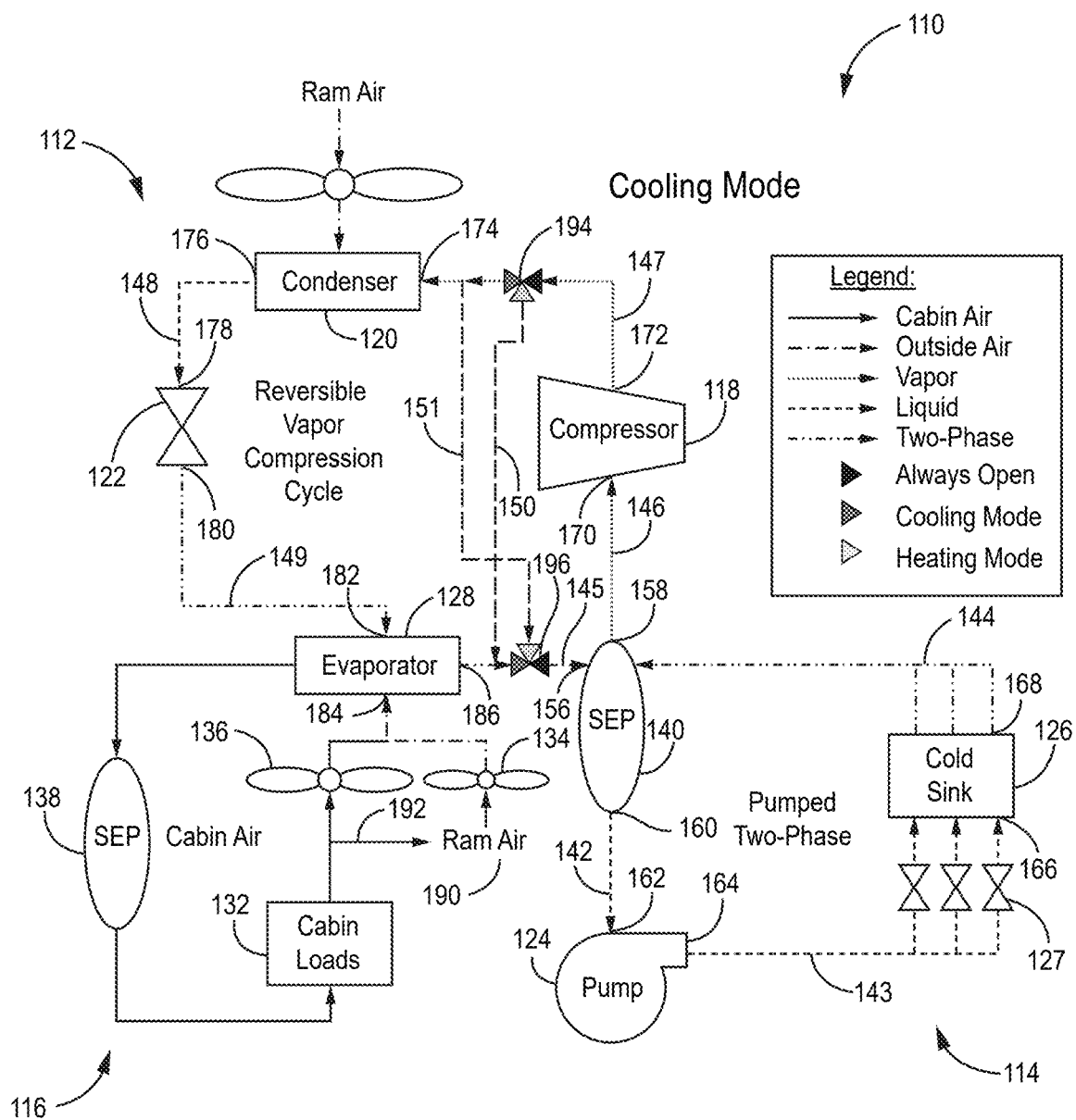
FIG. 2 is a schematic illustration of an alternative embodiment of a thermal management system that combines a vapor cycle compression loop with a pumped two-phase loop and an air loop to produce a liquid coolant stream and a cooled air stream in a cooling mode of operation.
Figure 3:
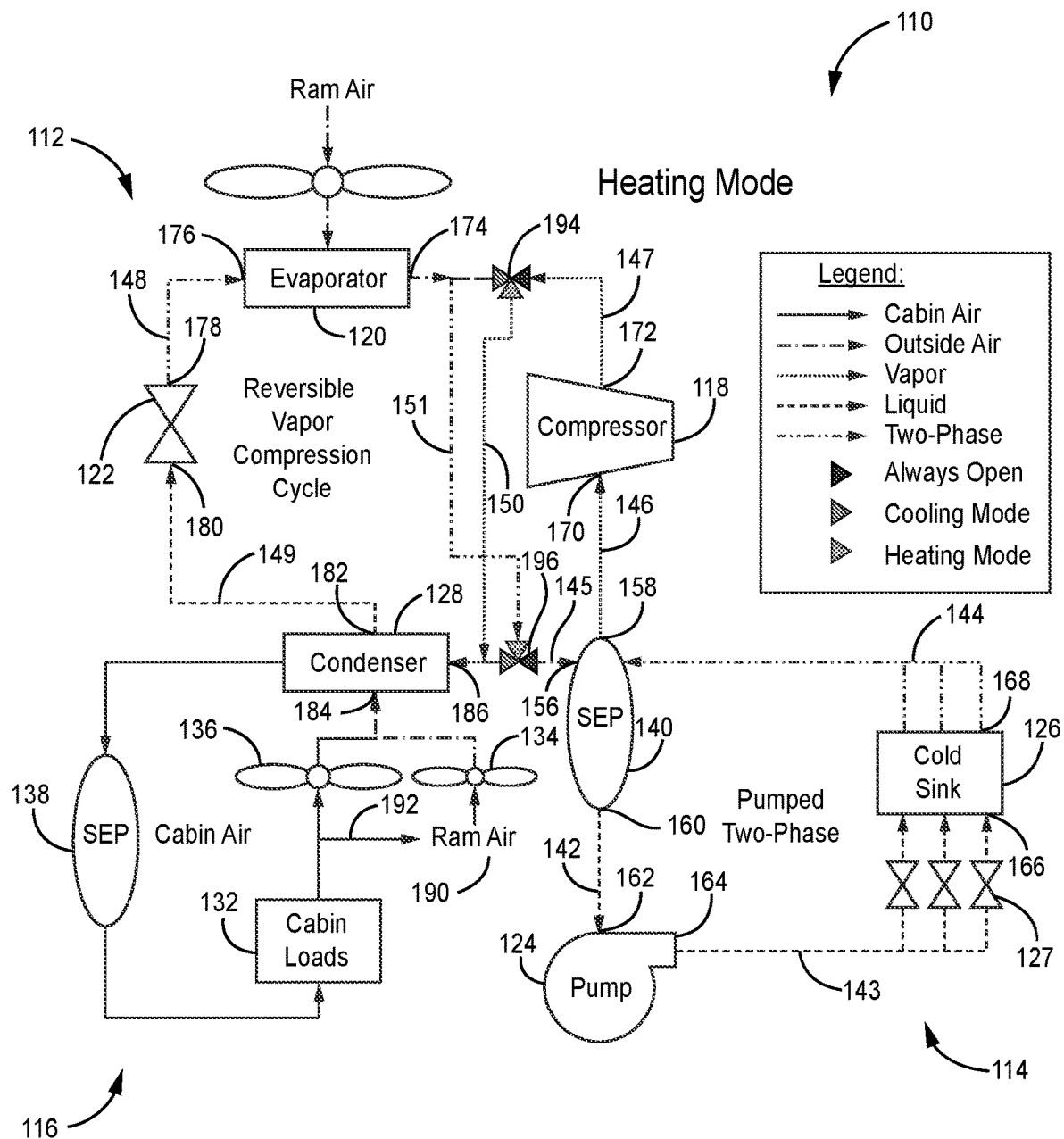
FIG. 3 is a schematic illustration of the thermal management system of FIG. 2 configured to produce a liquid coolant and a heated air stream in a heating mode of operation.

The working fluid from cold sink 26 can be delivered to evaporator 28 before returning to separator 40, as shown in FIG. 1. The working fluid from cold sink 26 can be joined with working fluid from vapor loop 12 before, at, or in evaporator 28. In some embodiments, the working fluid from cold sink 26 can join working fluid from vapor loop 12 at separator 40, for example, as shown in FIGS. 2 and 3. System 10 is configured to provide working fluid to evaporator 28 in a two-phase state. Working fluid can be received in separator 40 from evaporator 28 in a two-phase state.

Evaporator 28 is an air-refrigerant heat exchanger configured to provide cool air for an aircraft cabin and cabin loads. Evaporator 28 is in fluid communication with a ram air inlet (duct) 90 of the aircraft. Evaporator 28 is configured to receive ram air and recirculating cabin air at inlet 84 via blower fans 34 and 36, respectively. Evaporator 28 places working fluid received from vapor loop 12 and liquid loop 14 in thermal communication with inlet air to provide a cooling air supply. In some embodiments, air loop 16 can include separator 38 to remove water from the cooling air flow. Electric heaters 30 can be included for use during cold operational conditions when heating is required. As illustrated in FIG. 1, a portion of the cabin air can be exhausted through one or more ram exhaust outlets 92 and a portion can be recirculated through air loop 16.

Figure 4:
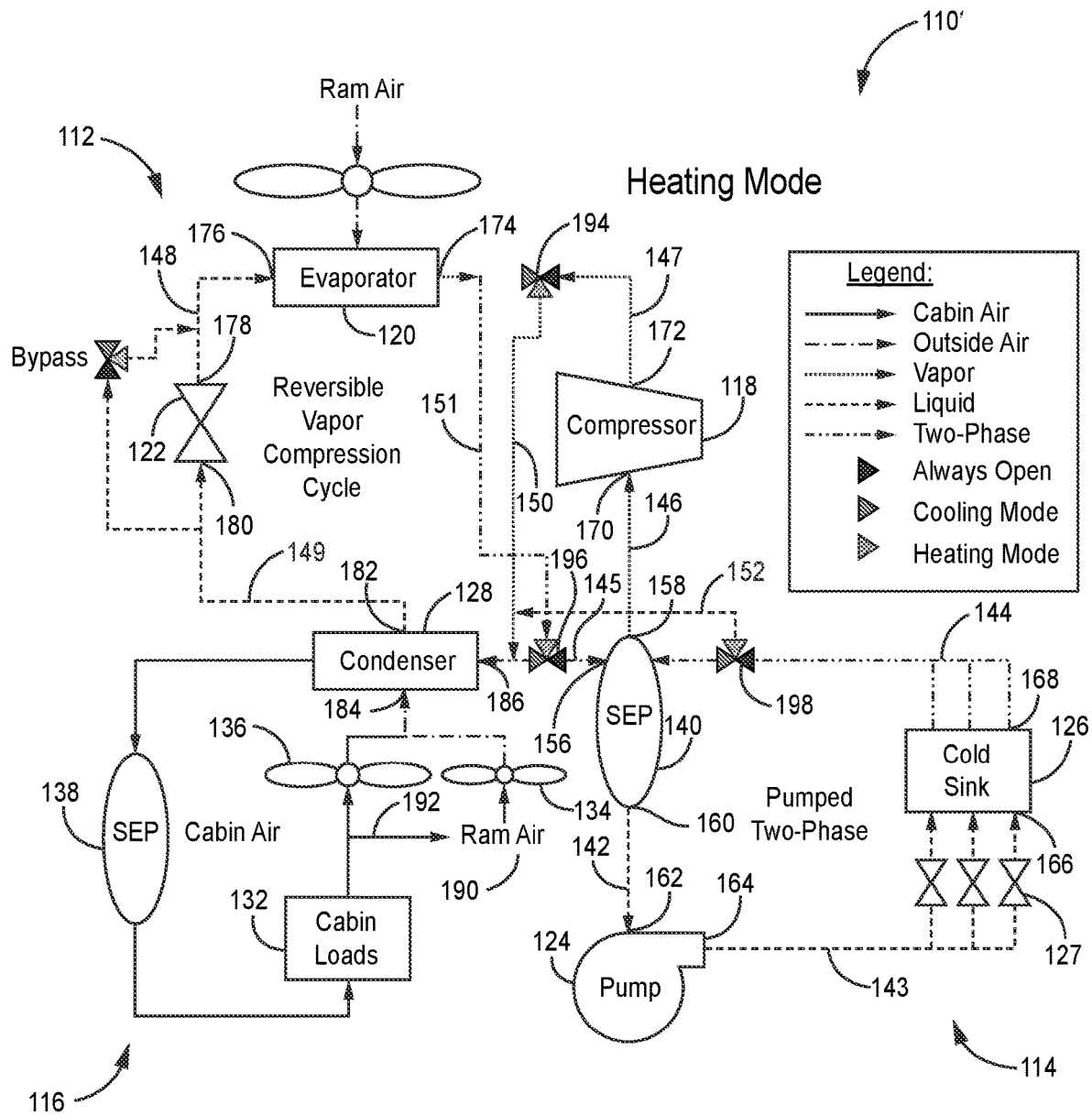
FIG. 4 is a schematic illustration of a further embodiment of the thermal management system of FIGS. 2 and 3, configured to produce a liquid coolant and a heated air stream in a heating mode of operation.

Utilization of electric heaters 30 can be an inefficient means for increasing the air temperature to meet a heating requirement. Two modifications can be made to system 10 to enable more efficient operation when heating is needed. First, as illustrated in FIGS. 2 and 3, valves can be strategically located to enable the vapor cooling cycle to operate in reverse mode, turning condenser 20 into an evaporator and turning evaporator 28 into a condenser such that heating of cabin air can be applied more efficiently by the vapor compression cycle. Second, as illustrated in FIG. 4, a valve can be strategically located downstream of cold sink 26 to bypass separator 40 and to pump the two-phase working fluid to the evaporator. This architecture allows heat from the cold sink to heat the cabin air and allows the compressor to remain off when operating conditions allow for it, drastically improving efficiency.

FIGS. 2 and 3 illustrate system 110 in a cooling mode of operation and heating mode of operation, respectively. System 110 is substantially similar to system 10 with the addition of valved fluid lines 145, 147, 150, and 151, configured to control the flow of working fluid through vapor loop 112 and air loop 116. Vapor loop 112 is configured as a reversible vapor compression cycle to provide heating of cabin air in place of electric heaters 30 of system 10.

FIGS. 2 and 3 show system 110, vapor loop 112, liquid loop 114, and air loop 116. Vapor loop 112 includes compressor 118, heat exchanger 120, and expansion valve 122. Liquid loop 114 includes pump 124, cold sink 126, and flow restrictions 127. Air loop includes heat exchanger 128, cabin loads 132, and fans 134, 136. Air loop can additionally include separator 138. System 110 includes separator 140 disposed in fluid communication with each of vapor loop 112, liquid loop 114, and air loop 116. Fluid lines 142-151, separator inlet 156 and outlets 158, 160, pump inlet 162 and outlet 164, cold sink inlets 166 and outlets 168, compressor inlet 170 and outlet 172, heat exchanger 120 inlets/outlets 174 and 176, expansion valve inlets/outlets 178 and 180, heat exchanger 128 inlets/outlets 182 and 186 and air inlet 184 and outlet 188, ram air inlet 190, exhaust outlet 192, and valves 194 and 196 are additionally shown. Fluid lines 142-151 schematically illustrate the direction of flow of fluid between components of system 110 and do not necessarily represent the arrangement of fluid conduits. For example, some of fluid lines 142-151 may be combined in a single conduit upstream or downstream of a component. Likewise, labelling of inlets and outlets of components of system 110 is provided merely to illustrate a direction of fluid flow and is not intended to limit the invention. System 110 can include additional components not shown as may be required for thermal management and/or fluid control.

Heat exchanger 120 is configured to operate as a condenser in the cooling mode of operation and an evaporator in the heating mode of operation. Heat exchanger 128 is configured to operate as an evaporator in the cooling mode of operation and a condenser in the heating mode of operation. As illustrated in FIGS. 2 and 3, valve 194 can be disposed to regulate fluid flow through fluid line 147 between compressor 118 and heat exchanger 120 and to regulate fluid flow through fluid line 150, fluidly connecting compressor 118 to heat exchanger 128. Valve 194 can be a three-way valve as illustrated, which remains open to fluid flow from compressor 118 and open to one of heat exchanger 120 or heat exchanger 128 depending on the mode of operation. In other embodiments, multiple valves and/or alternative architectures can be used to control flow between compressor 118 and heat exchangers 120 and 128.

Valve 196 can be disposed to regulate fluid flow through fluid line 145 between heat exchanger 128 and separator 140 and to regulate fluid flow through fluid line 151, fluidly connecting heat exchanger 120 and separator 140. Valve 196 can be a three-way valve as illustrated, which remains open to separator 140 and open to one of heat exchanger 120 or heat exchanger 128 depending on the mode of operation. In other embodiments, multiple valves and/or alternative architectures can be used to control flow between heat exchanger 120 and separator 140 and heat exchanger 128 and separator 140. In some embodiments, alternative architectures can be designed to maintain a fluid flow in a single direction through heat exchangers 120 and 128 in both heating and cooling modes of operation.

During the cooling mode of operation (shown in FIG. 2), system 110 operates in substantially the same manner as system 10 of FIG. 1. Valve 194 is open to fluid flow in fluid line 147 between compressor 118 and heat exchanger 120. Valve 194 is closed to fluid flow in fluid line 150 between compressor 118 and heat exchanger 128. Vaporized working fluid is received in compressor 118 from separator 140, is condensed by heat exchanger 120, functioning as a condenser in thermal communication with ram air (or air external to the aircraft). The working fluid is then expanded by expansion valve 122 for delivery to heat exchanger 128, functioning as an evaporator, in air loop 116.

Valve 196 is closed to fluid line 151 between heat exchanger 120 and separator 140 in the cooling mode. Valve 196 is open to fluid line 145 in the cooling mode, allowing working fluid flow from heat exchanger 128 to separator 140 consistent with operation of system 10.

During the heating mode (shown in FIG. 3), vapor compression cycle (vapor loop 112) operates in reverse to provide heating to cabin air in air loop 116. Valve 194 is open to fluid line 150, fluidly connecting compressor 118 and heat exchanger 128, and closed to heat exchanger 120 to direct vaporized working fluid from compressor 118 to heat exchanger 128 is air loop 116. Valve 196 is open to fluid line 151, fluidly connecting heat exchanger 120 and separator 140, and is closed to fluid line 145 connecting heat exchanger 28 and separator 140. Heat exchanger 128 functions as a condenser in the heating mode to add heat to air drawn from ram air and cabin air sources via fans 134 and 136 in air loop 116. The condensed liquid form of the working fluid is directed through expansion valve 122 to produce a two-phase fluid for delivery to heat exchanger 120. In the heating mode of operation. Heat exchanger 120 functions as an evaporator. The heated two-phase working fluid is delivered from heat exchanger 120 through fluid line 151 to separator 140 where it is separated into vapor and liquid components for delivery to vapor loop 112 and liquid loop 114, respectively. Operation of system 110 in the heating mode can provide heat to aircraft cabin air when needed while still providing cooling to cold sink 126 in liquid loop 114.

Valves 194 and 196 or equivalents thereof are electronically controlled to provide switching of system 110 between the cooling mode and heating mode of operation during operation of the aircraft. Switching from the cooling mode of operation to the heating mode of operation can include closing fluid line 147 connecting compressor 118 to heat exchanger 120, opening fluid line 150 connecting compressor 118 to heat exchanger 128, and opening fluid line 151 connecting heat exchanger 120 to separator 140. In this configuration, the working fluid flows in series from separator 140 to compressor 118, to heat exchanger 128, functioning as a condenser, to expansion valve 122, to heat exchanger 120, functioning as an evaporator, and back to separator 140. Switching from the heating mode of operation to the cooling mode of operation can include closing fluid line 150 connecting compressor 118 to heat exchanger 128, opening fluid line 147 connecting compressor 118 to heat exchanger 120, and closing fluid line 151 connecting heat exchanger 120 to separator 140. In this configuration, the working fluid flows in series from separator 140 to compressor 118, to heat exchanger 120, functioning as a condenser, to expansion valve 122, to heat exchanger 128, functioning as an evaporator, and back to separator 140.

Utilization of the reversible vapor compression cycle in system 110 can provide air heating/cooling and liquid cooling to meet aircraft thermal requirements with improved efficiency and reduced weight.

In some operational conditions requiring heating cabin air, it may not be necessary to run compressor 118. FIG. 4 illustrates system 110', which includes the addition of valve 198, fluid line 152, bypass line 200, and valve 202. System 110' can be substantially similar to system 110 with the addition of valves 198 and 202, fluid line 152, and bypass line 200. System 110' is configured to direct fluid from cold sink 126 to heat exchanger 128 to heat cabin air during the heating mode of operation. This architecture allows the heat from the heat loads in thermal communication with cold sink 126 to heat the cabin air and allows the compressor to remain off when conditions allow for it, drastically improving efficiency.

System 110' can operate in the same manner as system 110 during a cooling mode of operation. System 110' has multiple heating modes of operation. In a first heating mode of operation, system 110' can operate in the same manner as system 110 during the heating mode of operation of system 110. In a second heating mode of operation, compressor 118 can be off and heating can be supplied to air loop 116 from cold sink 126.

Fluid line 152 fluidly connects cold sink 126 to heat exchanger 128 thereby bypassing separator 140 and compressor 118. In this embodiment, heat exchanger 128 functions as a condenser disposed in fluid communication between cold sink 126 and heat exchanger 120. Valve 198 can be a three-way valve as illustrated in FIG. 4, which remains open to cold sink 126 during all modes of operation and open to either separator 140 or heat exchanger 128 depending on the heating mode of operation selected.

During operational conditions that allow compressor to remain off, valve 198 is closed to separator 140 and open to fluid line 152, allowing working fluid to flow from cold sink 126 to heat exchanger 128, which functions as a condenser to heat cabin air as discussed with respect to system 110 in the heating mode of operation. In the second heating mode of operation, working fluid received in heat exchanger 128 from cold sink 126 can flow in reverse through a portion of vapor loop 112 from heat exchanger 128 to heat exchanger 120 (functioning as an evaporator) and back to separator 140 via fluid line 151. With compressor 118 off, system 110' functions strictly as a pumped two-phase loop with no temperature lift due to pressure reduction. Fluid flow from heat exchanger 128 therefore must bypass expansion valve 122. As illustrated in FIG. 4, fluid flow from heat exchanger 128 can bypass expansion valve 122 via bypass line 200. Fluid flow through bypass line can be controlled by valve 202.

Any of the disclosed embodiments herein can include additional components not shown as may be required for thermal management and/or fluid control. For example, some embodiments may include a heat exchanger disposed between cold sink 26, 126 and separator 40, 140. Such heat exchanger can be, for example and without limitation, a phase change heat exchanger. It will be appreciated that the heat loads may be cyclic and vary significantly over the duration of the cycle. Rather than design the entire system to handle the maximum load, significant weight and cost savings can be achieved if a heat exchanger is used to reduce the peak loads such that a smaller overall cooling system can be used. A heat exchanger arranged downstream of cold sink 26, 126 can condense the excess vapor that is generated when the heat loads in thermal communication with cold sink 26, 126 are at a maximum. Placing the heat exchanger immediately after (downstream) of cold sink 26, 126 allows the excess vapor to be condensed, thereby maintaining a constant amount of vapor generation that compressor 18, 118 can condense in vapor loop 12, 112, allowing the system pressure to remain constant.

The disclosed thermal management systems integrate pumped two-phase cooling with a reversible vapor compression cycle and cabin cooling to meet FVL aircraft requirements for reduced weight and for providing both air and liquid coolant streams in a narrow range of temperatures.

While the invention has been described with reference to an exemplary embodiment(s), it will be understood by those skilled in the art that various changes may be made and equivalents may be substituted for elements thereof without departing from the scope of the invention. The present disclosure can be modified to incorporate any number of variations, alterations, substitutions, combinations, sub-combinations, or equivalent arrangements not heretofore described, but which are commensurate with the scope of the present disclosure. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

A thermal management system for an aircraft includes a liquid loop, a vapor compression cycle loop, and an air loop. The liquid loop includes a pump to deliver a working fluid a cold sink for cooling a heat load with the working fluid. The vapor compression cycle loop is fluidly coupled to the liquid loop by a separator. The separator is configured to separate a two-phase form of the working fluid into a vapor form of the working fluid for delivery to a compressor of the vapor compression cycle loop and a liquid form of the working fluid for delivery to the liquid loop. The air loop in thermal communication with the working fluid and configured to provide a cooling or heating air for an aircraft cabin.

The thermal management system of the preceding paragraph can optionally include, additionally and/or alternatively, any one or more of the following features, configurations and/or additional components:

In an embodiment of the preceding thermal management system, the vapor compression cycle loop can include a first heat exchanger configured to be fluidly coupled to the compressor in a first mode of operation and a second heat exchanger configured to be fluidly coupled to the compressor in a second mode of operation, wherein second heat exchanger is disposed to place the working fluid in thermal communication with the air loop.

An embodiment of any of the preceding thermal management systems can further include a first valved fluid line configured to operatively couple the compressor to the first heat exchanger and a second valved fluid line configured to operatively couple the compressor to the second heat exchanger.

In an embodiment of any of the preceding thermal management systems, the first mode of operation is a cooling mode and the second mode of operation is a heating mode. The first valved fluid line is configured to be open to flow of the working fluid and the second valved fluid line is configured to be closed to flow of the working fluid in a cooling mode of operation. The second valved fluid line is configured to be open to flow of the working fluid and the first valved fluid line is configured to be closed to flow of the working fluid in a heating mode of operation.

In an embodiment of any of the preceding thermal management systems, the first heat exchanger can be configured to function as a condenser in the cooling mode of operation and the second heat exchanger is configured to function as an evaporator in the cooling mode of operation.

In an embodiment of any of the preceding thermal management systems, the vapor compression cycle loop can be configured, in the cooling mode of operation, to deliver the working fluid from the separator to the compressor, to the first heat exchanger, to an expansion valve, to the second heat exchanger, and back to the separator.

In an embodiment of any of the preceding thermal management systems, the first heat exchanger can be configured to function as an evaporator in the heating mode of operation and the second heat exchanger is configured to function as a condenser in the heating mode of operation.

In an embodiment of any of the preceding thermal management systems, the vapor compression cycle loop can be configured, in the heating mode of operation, to deliver the working fluid from the separator to the compressor, to the second heat exchanger, to an expansion valve, to the first heat exchanger, and back to the separator.

An embodiment of any of the preceding thermal management systems can further include a third valved fluid line configured to fluidly connect the cold sink of the liquid loop to the separator and a fourth valved fluid line configured to connect the cold sink to the second heat exchanger.

In an embodiment of any of the preceding thermal management systems, the third valved fluid line can be open and the fourth valved fluid line is closed during each of the cooling mode of operation and the heating mode of operation.

In an embodiment of any of the preceding thermal management systems, the third valved fluid line can be closed and the fourth valved fluid line is open during an alternate heating mode of operation.

In an embodiment of any of the preceding thermal management systems, the compressor can be off during the alternate heating mode of operation.

In an embodiment of any of the preceding thermal management systems, each of the first valved fluid line and the second valved fluid line can be a three-way electronically controlled switchable valve.

A method of operating a thermal management system for an aircraft includes separating, by a separator, a vapor form of a working fluid from a liquid form of a working fluid; delivering the liquid form of the working fluid from the separator to a liquid loop, the liquid loop comprising a pump and a cold sink fluidly coupled in flow series; delivering the vapor form of the working fluid from the separator to a reversible vapor compression cycle loop, the reversible vapor compression cycle loop comprising a compressor, a first heat exchanger, a second heat exchanger, and an expansion valve; and cooling a cabin air of the aircraft with the working fluid in a cooling mode of operation or heating the cabin air of the aircraft with the working fluid in a heating mode of operation. Cooling and heating the cabin air comprises placing an air flow in thermal communication with working fluid in the second heat exchanger.

The method of the preceding paragraph can optionally include, additionally and/or alternatively, any one or more of the following features, configurations, additional components, and/or steps:

In an embodiment of the preceding method, cooling the cabin air can include directing a flow of the working fluid received from the compressor to the first heat exchanger and from the first heat exchanger to the second heat exchanger, the first heat exchanger configured to function as a condenser and the second heat exchanger configured to function as an evaporator and the in the cooling mode of operation.

In an embodiment of any of the preceding methods, heating the cabin air can include directing a flow of the working fluid received from the compressor to the second heat exchanger and from the second heat exchanger to the first heat exchanger, the second heat exchanger configured to function as a condenser and the first heat exchanger is configured to function as an evaporator in the heating mode of operation.

An embodiment of any of the preceding methods can further include switching between the cooling mode of operation and the heating mode of operation.

In an embodiment of any of the preceding methods, switching from the cooling mode of operation to the heating mode of operation can include closing a fluid line connecting the compressor to the first heat exchanger, opening a fluid line connecting the compressor to the second heat exchanger, and opening a fluid line connecting the first heat exchanger to the separator.

In an embodiment of any of the preceding methods, switching from the heating mode of operation to the cooling mode of operation can include closing a fluid line connecting the compressor to the second heat exchanger, opening a fluid line connecting the compressor to the first heat exchanger, and opening a fluid line connecting the second heat exchanger to the separator.

In an embodiment of any of the preceding methods, the heating mode of operation can include closing a fluid line connecting the compressor to the first heat exchanger, closing a fluid line connecting the cold sink to the separator, and opening a fluid line connecting the cold sink to the second heat exchanger. The compressor of the compression vapor cycle loop can be off during the heating mode of operation

The invention claimed is:

1. A thermal management system for an aircraft, the thermal management system comprising:
   a liquid loop comprising:
      a pump to deliver a working fluid; and
      a cold sink for cooling a heat load with the working fluid;
   a vapor compression cycle loop fluidly coupled to the liquid loop by a separator, the separator configured to separate a two-phase form of the working fluid into a vapor form of the working fluid for delivery to a compressor of the vapor compression cycle loop and a liquid form of the working fluid for delivery to the liquid loop; and
   an air loop in thermal communication with the working fluid and configured to provide cooling or heating air for an aircraft cabin.

2. The thermal management system of claim 1, wherein the vapor compression cycle loop comprises:
   a first heat exchanger configured to be fluidly coupled to the compressor in a first mode of operation; and
   a second heat exchanger configured to be fluidly coupled to the compressor in a second mode of operation, wherein the second heat exchanger is disposed to place the working fluid in thermal communication with the air loop.

3. The thermal management system of claim 2 and further comprising:
   a first valved fluid line configured to operatively couple the compressor to the first heat exchanger; and
   a second valved fluid line configured to operatively couple the compressor to the second heat exchanger.

4. The thermal management system of claim 3, wherein the first mode of operation is a cooling mode and the second mode of operation is a heating mode; and
   wherein the first valved fluid line is configured to be open to flow of the working fluid and the second valved fluid line is configured to be closed to flow of the working fluid in a cooling mode of operation; and
   wherein the second valved fluid line is configured to be open to flow of the working fluid and the first valved fluid line is configured to be closed to flow of the working fluid in a heating mode of operation.

5. The thermal management system of claim 4, wherein the first heat exchanger is configured to function as a condenser in the cooling mode of operation and the second heat exchanger is configured to function as an evaporator in the cooling mode of operation.

6. The thermal management system of claim 5, wherein the vapor compression cycle loop is configured, in the cooling mode of operation, to deliver the working fluid from the separator to the compressor, to the first heat exchanger, to an expansion valve, to the second heat exchanger, and back to the separator.

7. The thermal management system of claim 4, wherein the first heat exchanger is configured to function as an evaporator in the heating mode of operation and the second heat exchanger is configured to function as a condenser in the heating mode of operation.

8. The thermal management system of claim 7, wherein the vapor compression cycle loop is configured, in the heating mode of operation, to deliver the working fluid from the separator to the compressor, to the second heat exchanger, to an expansion valve, to the first heat exchanger, and back to the separator.

9. The thermal management system of claim 7, and further comprising a third valved fluid line configured to fluidly connect the cold sink of the liquid loop to the separator and a fourth valved fluid line configured to connect the cold sink to the second heat exchanger.

10. The thermal management system of claim 9, wherein the third valved fluid line is open and the fourth valved fluid line is closed during each of the cooling mode of operation and the heating mode of operation.

11. The thermal management system of claim 10, wherein the third valved fluid line is closed and the fourth valved fluid line is open during an alternate heating mode of operation.

12. The thermal management system of claim 11, wherein the compressor is off during the alternate heating mode of operation.

13. The thermal management system of claim 4, wherein each of the first valved fluid line and the second valved fluid line comprises a three-way electronically controlled switchable valve.

* * * * *